(12) United States Patent
Hanechak

(10) Patent No.: US 8,225,198 B2
(45) Date of Patent: Jul. 17, 2012

(54) FLEXIBLE WEB PAGE TEMPLATE BUILDING SYSTEM AND METHOD

(75) Inventor: Brian D. Hanechak, Waltham, MA (US)

(73) Assignee: Vistaprint Technologies Limited, Hamilton (BM)

( * ) Notice: Subject to any disclaimer, the term of this patent is extended or adjusted under 35 U.S.C. 154(b) by 1142 days.

(21) Appl. No.: 12/060,254

(22) Filed: Mar. 31, 2008

(65) Prior Publication Data

US 2009/0249193 A1  Oct. 1, 2009

(51) Int. Cl.
 *G06F 17/00* (2006.01)
 *G06F 3/048* (2006.01)

(52) U.S. Cl. ........ 715/243; 715/272; 715/240; 715/801; 715/798; 715/815

(58) Field of Classification Search .............. 715/243, 715/272, 240, 801, 798, 815
See application file for complete search history.

(56) References Cited

U.S. PATENT DOCUMENTS

| | | | |
|---|---|---|---|
| 5,586,242 A * | 12/1996 | McQueen et al. | 345/467 |
| 5,909,678 A * | 6/1999 | Bergman et al. | 1/1 |
| 6,448,986 B1 * | 9/2002 | Smith | 715/801 |
| 6,456,305 B1 * | 9/2002 | Qureshi et al. | 715/800 |
| 6,546,397 B1 * | 4/2003 | Rempell | 1/1 |
| 6,980,205 B1 | 12/2005 | Zettsu et al. | |
| 2003/0025737 A1 * | 2/2003 | Breinberg | 345/801 |
| 2004/0123244 A1 * | 6/2004 | Campbell et al. | 715/517 |
| 2004/0225962 A1 * | 11/2004 | Ohashi et al. | 715/517 |
| 2006/0059418 A1 | 3/2006 | Elkady | |
| 2008/0301546 A1 * | 12/2008 | Moore et al. | 715/243 |

FOREIGN PATENT DOCUMENTS

EP 1211624 A2 6/2002

OTHER PUBLICATIONS

Anonymous: "Expanding table" STEALTHDESIGNZ.COM, Feb. 11, 2005, XP002558953.
Byrd, James H.: "Building HTML Tables with XSL" Computer Companion, Feb. 5, 2007, XP002558954.

* cited by examiner

Primary Examiner — Kyle Stork
Assistant Examiner — Keith Bloomquist
(74) Attorney, Agent, or Firm — Jessica Costa

(57) ABSTRACT

Flexible web page template building systems, methods and applications using an auto-expanding user-editable content container(s) are presented. A web page template displayable on a user display is configured with at least one auto-expanding user-editable content container that includes a predefined top portion, a pre-defined bottom portion, and a repeatable middle portion, The auto-expanding user-editable content container is configured to monitor the size of user-provided content in the content container relative to the size of the content container upon entry or removal of content and automatically adjust the size of the content container to fit the user-provided content by dynamically inserting or removing instance(s) of the middle portion of the content container to vertically expand or contract the size of the content container to fit the user-provided content.

15 Claims, 10 Drawing Sheets

| Background cell | Main content cell, fixed width of 792 pixels | Background cell |

US 8,225,198 B2

FLEXIBLE WEB PAGE TEMPLATE BUILDING SYSTEM AND METHOD

FIELD OF THE INVENTION

This invention relates to creation and design of electronic documents and, more particularly, to flexible web page template building techniques and systems.

BACKGROUND OF THE INVENTION

Customizable web page templates for designing websites assist people in quickly designing web pages for publishing to a web hosting server.

One of the challenges in designing web page templates whose content may be customized by end users is that the size of the content or amount of text that may be inserted into the editable areas of the web page may vary from user to user. Because a web page generally provides a header area, a navigational area, and a bottom border around editable areas that may be customized by a user, the template design required some knowledge of the size of the editable areas. Previously, this has caused template providers to set a static size editable area, thereby limiting the amount of content that the user can insert in the editable areas.

Another challenge for the designers of web page templates is the desirability of making web page themes work in all types of browsers.

Accordingly, it would be desirable to provide web page generating tool that has a simple user interface and allows a web page designer to creates flexible auto-expanding editable areas which grow and shrink based on the amount of content inserted into the editable areas, and to design themes that work in all browsers.

SUMMARY OF THE INVENTION

Embodiments of the invention are directed to flexible web page template building techniques and systems which allow web page designers to build auto-expanding web pages that grow and shrink according to an amount of user content inserted there.

DETAILED DESCRIPTION

Figure 1:
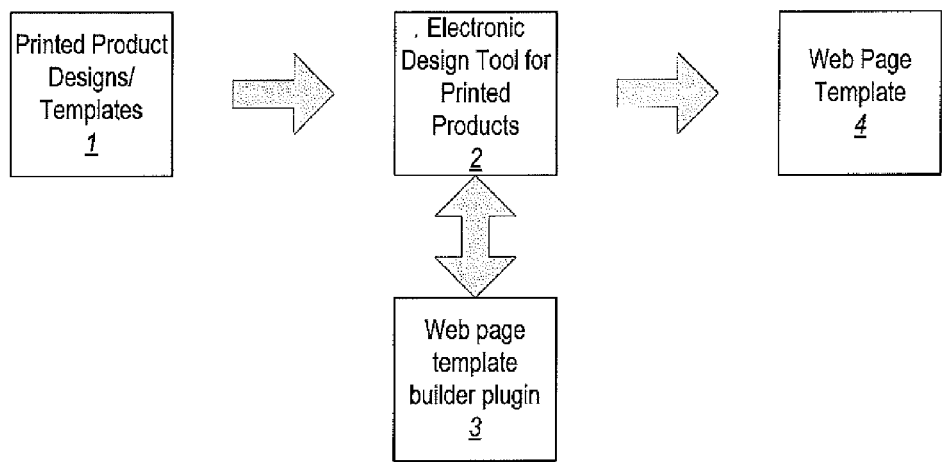
FIG. 1 is a diagrammatic representation of a web page template building plugin.

Embodiments of the invention implement a flexible website template building tool. In an embodiment, an electronic document design tool used to design customized electronic designs which may be published electronically or printed to generate a printed product includes a website template builder add-in which allows a designer to customize a website template based on elements of an electronic design. For example, FIG. 1 shows diagrammatically, an electronic design tool for printed products 2 which receives or creates an electronic version of a printed product design 1. The electronic design tool 2 includes a website add-in control 3 which, when activated, generates a web page template 4 including at least one element from the printed product design 1.

Web page templates 4 may be valuable to website hosting service providers that provide tools to customers to build their websites. Web page templates 4 may also be valuable to designers of electronic, printed, and other types of products who wish to cross-sell a website to a customer of an electronic, printed, or other type of product while retaining some of the design features of the other product.

Figure 2:
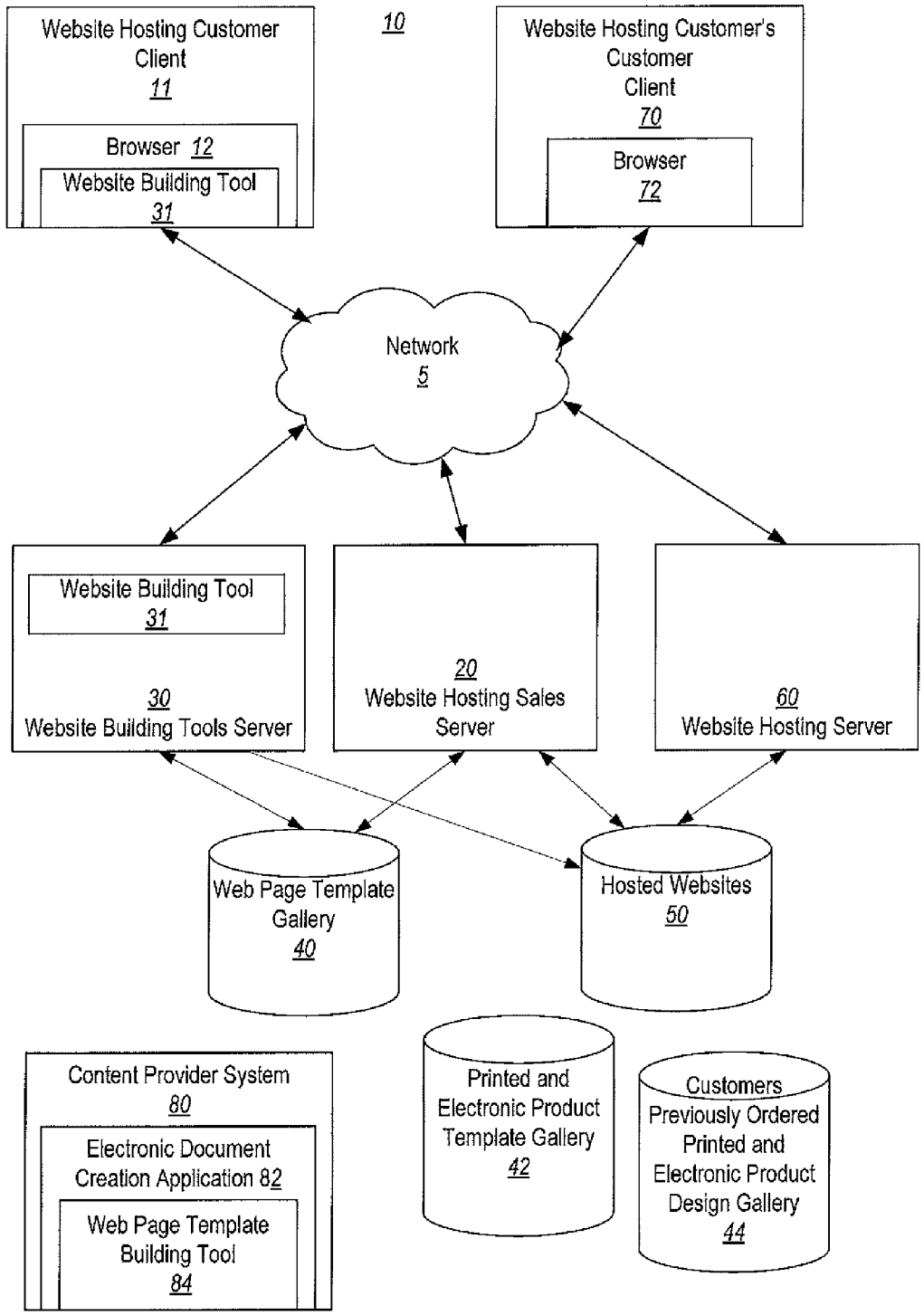
FIG. 2 is a block diagram illustrating a network environment in which an embodiment of the invention operates.

For example, FIG. 2 illustrates a networked system 10. Client System 11 represents a user's computer system, for example, a customer of a website hosting service. Client system 11 is a typically equipped modern personal computer, discussed with reference to FIG. 1B, being configured to communicate over the Web and running a modern Web browser program 12. For purposes of discussion, the invention will be described in the context of a personal computer running the Microsoft Internet Explorer browser, but it will be appreciated that the invention can be applied to other browser programs that support HTML, XHTML, DHTML, XML, and other web functionality and to other intelligent devices, such as PDAs capable of running such a browser.

Client 11 communicates with a website hosting service server 20 to set up account information and order website hosting services via the client's browser 12. After setting up an account, the website hosting customer may then begin designing and editing their website. In an exemplary embodiment, the website hosting service provides website building tools via website building tools server 30. In an embodiment, the client 11 may download a website building tool 31 to execute in their local browser 12.

The website building tool 31 allows the website hosting services customer to download web page templates (stored in a web page template gallery 40) from the website building tools server 30. Website templates are electronic web page designs that include editable areas to allow the customer to customize text, image, and design content. They typically include a background with or without a design, a header area, a navigational menu area, and one or more user-editable content areas. The website hosting services customer may edit and design a number of customized web pages to form a customized website which may be published to a hosted website database 50. When a web page is published to the hosted websites database 50, a website hosting server 60 will serve web pages of the hosted customized website to other networked clients on the network, such as client 70.

Figure 3:
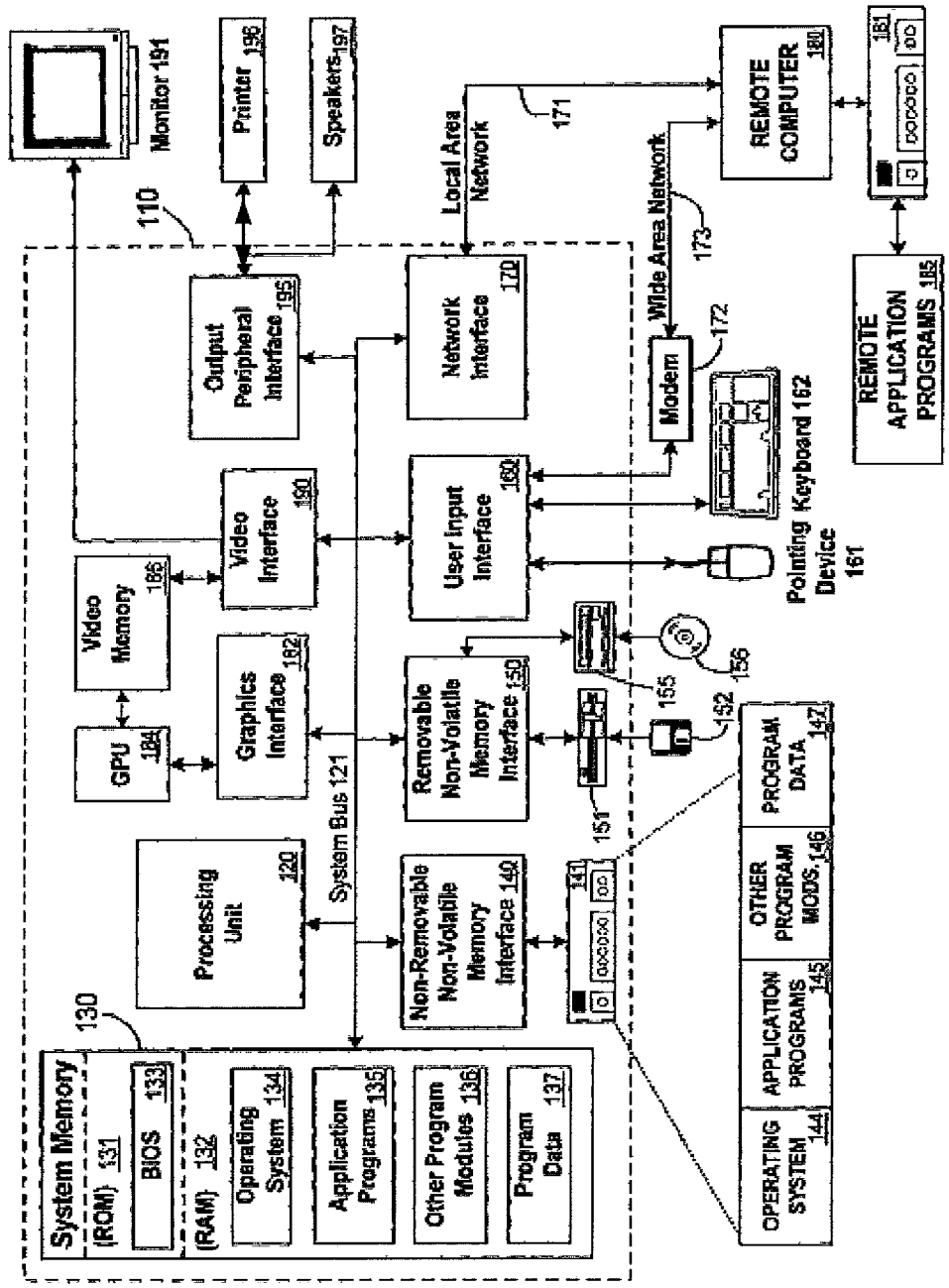
FIG. 3 is a block diagram illustrating a user computer environment in which an electronic publishing tool may operate.

Web page templates may be created by a content designer operating a content provider computer system 80, which may be any conventional computer system, for example, as described in reference to FIG. 3. An electronic document creation and editing application 82 executes on the content provider system 80, either locally, or remotely via a conventional networked configuration (not shown), and allows the content provider to create electronic documents, for example documents that may be printed or viewed on a display. The electronic document creation and editing application 82 may also open and edit previously designed documents. For example, the website hosting sales server 20 may also be an online printed and electronic products retailer which offers products such as business cards, postcards, brochures, etc. to customers, for example client 70. The server 20 may thus provide customizable designs or templates (stored in product template database 42) that may be edited by a customer of the online printed and electronic products retails and then ordered for printing/publishing and delivery to the customer. Customized product designs may be subsequently stored (in a customers customized products database 44) for future access by the retailer to allow the customer to return to the website and reorder the customized products.

The electronic document creation and editing application 82 may itself provide, or may merely provide access to, a web page template building tool 84. For example, a conventional electronic document publishing system may include an add-in or plug-in.

A plugin is a computer program that interacts with a host application (for example, the electronic document creation and editing application 82) to provide a function "on demand". Alternatively, the electronic document creation and editing application 82 may itself implement the functionality for automatically creating web page templates.

The web page template building tool 84 automatically generates web page templates based on electronic documents, the details of which are presented hereinafter.

Turning now to FIG. 3, there is presented an example of a suitable computing system environment 100 which may implement any and all of the clients 11, 70, servers 20, 30, 60, and content provider system 80. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations.

Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention, and in particular, the website building tool 31 and its target-alignment-and-drop control 32 integrated therein, may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport button and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate button. In a networked environment, program modules depicted relative to the computer 110, or portions thereof may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Referring back to FIG. 2, each web page template in the web page template gallery 40 represents a thematic design of a single page of a website. As previously explained, in order for the website building tool 122 to offer web page templates, such templates must first be created. In one embodiment, electronic document creation and editing application 82, such as Adobe® InDesign, which are intended for design of products to be printed, are utilized to take advantage of content developed for printed products. In an embodiment, the electronic document and editing application 82 is configured with a website plugin which, in accordance with the invention described herein, assists the customer in generating a website template based on a printed or electronic product design.

Figure 4:
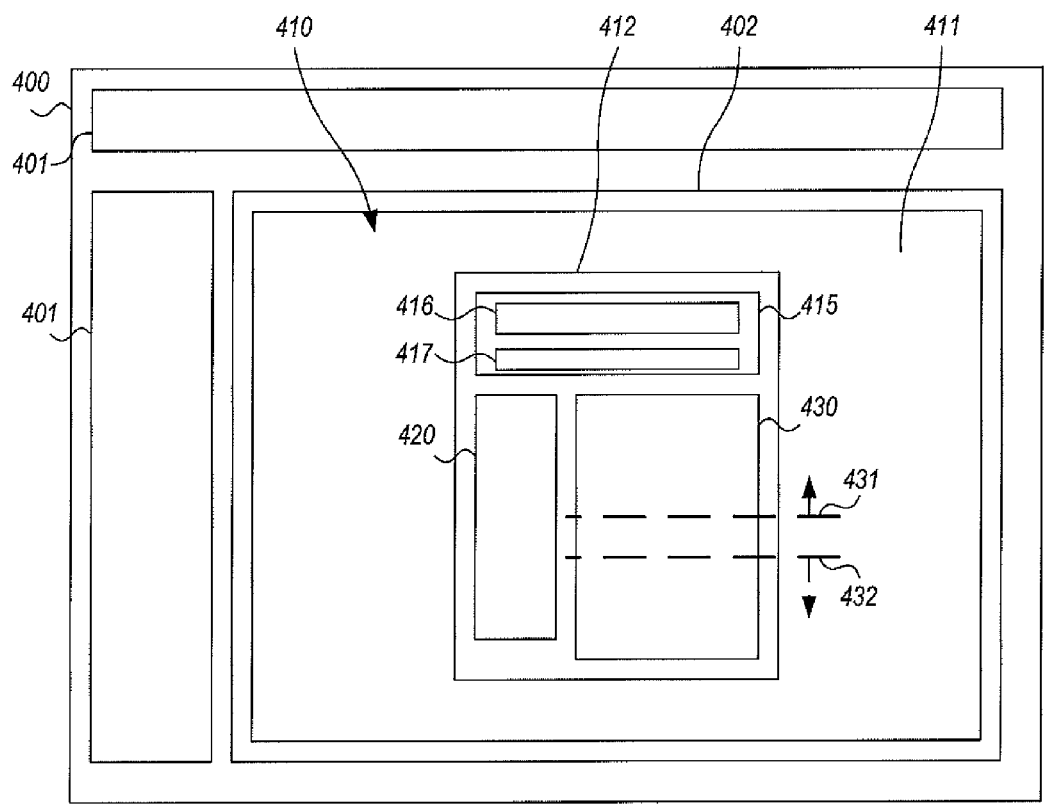
FIG. 4 is a screen shot view of an example user interface display 400 of an example web page template building tool.

FIG. 4 is a screen shot view of an example user interface display 400 of an example web page template building tool. For example, the web page template building tool may exist as a standalone application, may be integrated into an electronic document creation and editing application, or may be a plugin to such an application. As illustrated in FIG. 4, the user interface display 400 includes editing controls 401 known and standardly used within electronic document creation and editing applications, and a workspace 402 for designing a web page template 410.

The web page template 410 assumes an 800-wide-pixel displayable page area, but of course it is to be understood that this number may be varied depending on the intended browser and display types, and on future advances in the display technology. The web page template 410 includes an outer background 411 which represents what should appear on a display outside of the 800-wide-pixel displayable page area, and inner background 412 which covers the outer background within the 800-pixel-wide area, a header area 415, a navigational area 420, and at least one auto-expanding user-editable content container 430. In the exemplary embodiment, the header area 415 includes two "headline" areas of text: one for "Company Name" 416 and one for "Company Message" 417. Preferably, while the auto-expanding user-editable content container allows only web-safe fonts, the header area 415 can support non-web-safe fonts, for example fonts that are used in the customer's logo or business cards.

In order to maximize the size of text entered in the headline areas 416, 417, the current size of the text entered in the text area is determined using a Rich Text Editor, and the web page template building tool 82 automatically determines an amount to scale the current sized text to make the text the full width of the available text area, and then determines an amount to scale the current sized text to make the text the full height of the available text area. The web page template building tool 82 then selects the smaller of the horizontal scale and vertical scale, scales the user-input text by the smaller selected scale, and replaces the user-input text in the text area with the scaled text.

In order to support growing and shrinking of content in the auto-expanding user-editable content container(s) 430, there are certain rules which must be applied in the design of the web page template. For example, the outer background may only contain a solid color, vertical gradient, or repeated pattern so that as the auto-expanding user-editable content container(s) grow, any visible outer background area on a user's display will appear continuous. Furthermore, if a gradient is used and the page is long, the color at the bottom of the gradient is preferably used as a solid color below where the gradient is specified. The inner background preferably may only comprise a solid color.

The auto-expanding user-editable content container 430 is displayed with a pair of horizontal guides—an upper horizontal guide 431 and a lower horizontal guide 432. The user content must intersect with both the upper guide and the lower guide. Preferably, a few lines of sample text are inserted in the auto-expanding user-editable content container to illustrate to the user the default styles and fonts. In an embodiment, the user content sample text may only comprises web-safe fonts (restricted list of about eight fonts) that are known to be supported by most web browsers.

In an embodiment, artwork can extend into the user content area, and is rendered behind the user content.

The upper guide 431 must be above the lower guide 432. Any elements which cross the upper guide 431 or the lower guide 432 must cross both guides. Any elements which cross the guides 431, 432 must be "growable". To be growable, either: the element is a repeating pattern, or there is no variation in the vertical directions between the two guides 431, 432 (that is, every row of pixels between the guides is the same as every other row.)

Figure 5A:
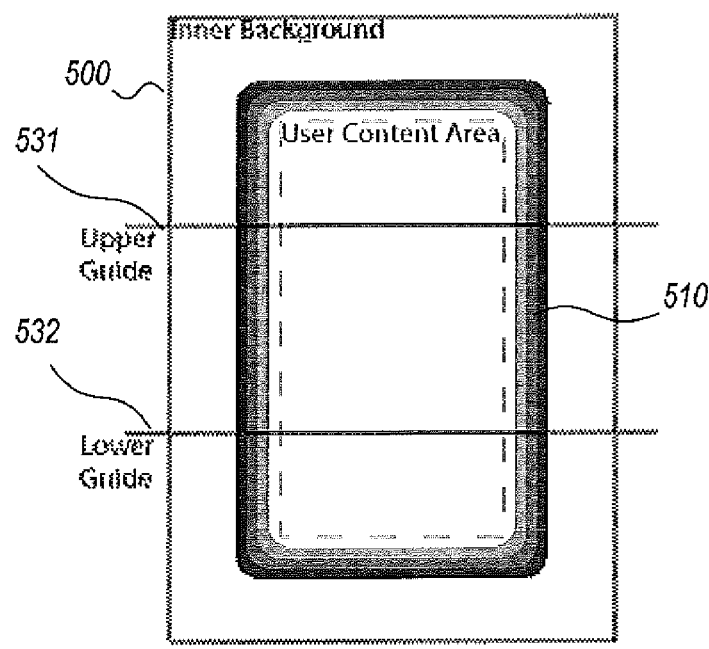
FIG. 5A is an example auto-expanding user-editable content container illustrating application of the guides, in particular with respect to a variation in the vertical direction of content between the guides.
Figure 5B:
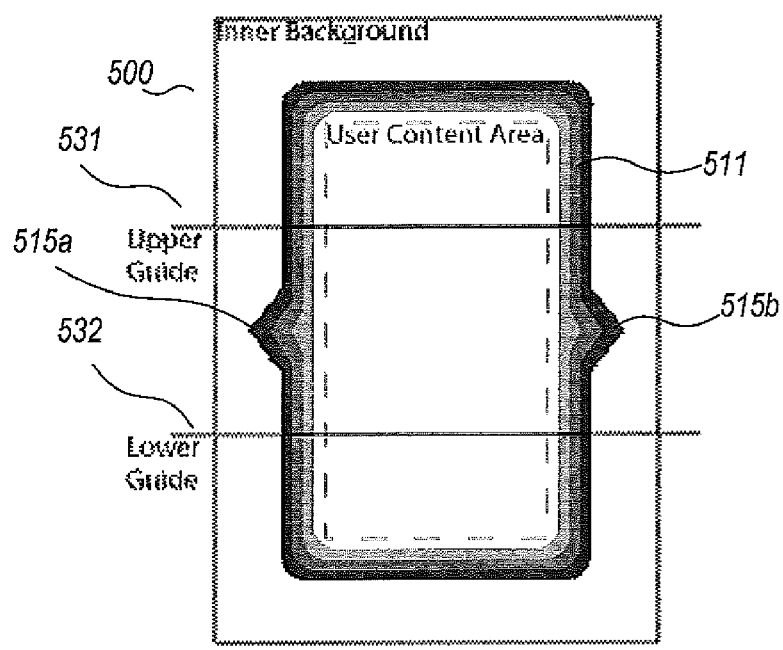
FIG. 5B illustrates the auto-expanding user-editable content container of FIG. 5A where the guides are set to a position which comprises variation in the vertical direction of content between the guides.

To illustrate the rules pertaining to the guides 431, 432, FIG. 5A depicts content inserted in an auto-expanding user-editable content container 500 that complies with the above rules. That is, there is no variation in the vertical direction in the parts of the frame 510 inserted in the auto-expanding user-editable content container 500 between the two guides 531, 532. FIG. 5B depicts content inserted in an auto-expanding user-editable content container 500 that violates the user content rules. In this embodiment, the center pointed portions 515a, 515b of the frame 511 have variation in the vertical direction between the two guides 531, 532. If desired, the "bad" design in FIG. 5B could be brought into compliance with the rules by simply moving the upper guide 531 below the pointed portions 515a, 515b of the frame 511. However, by doing so, since the bottom half of the frame 511 may be expanded to fit more user content, the pointed portions 515a, 515b of the frame 511 will not remain vertically centered with respect to the top and bottom of the frame 511.

In elements in the auto-expanding user-editable content container 400 that span both guides 431, 432, if there are multiple repeated patterns, the repeated frequency in the vertical direction must be the same, and the repeat should be as small as possible. This is because, in the final webpage, we have to match up any patterns which cross the bottom guide with the artwork below the bottom guide.

Figure 6A:
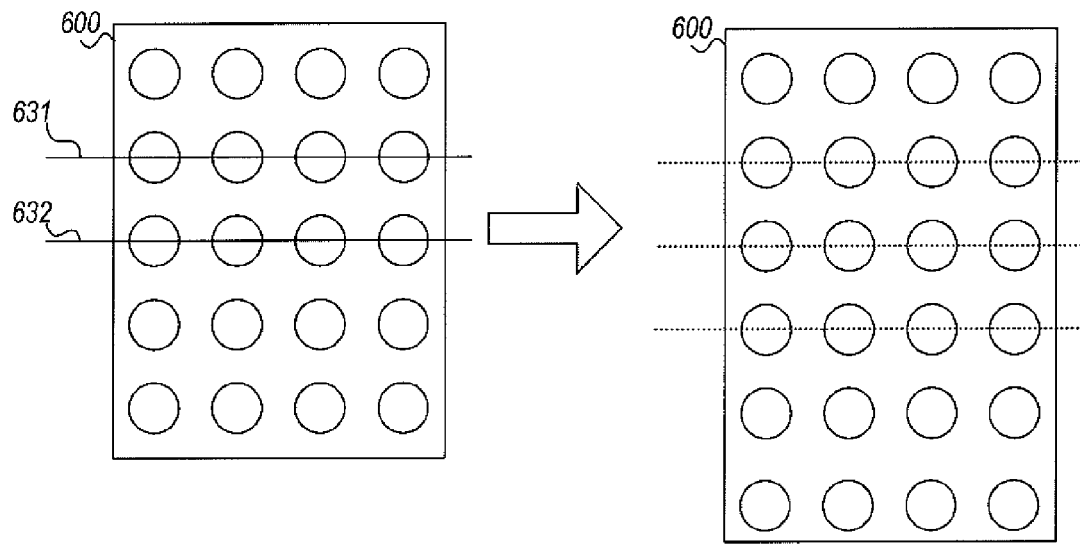
FIG. 6A is an example auto-expanding user-editable content container illustrating application of the guides, in particular with respect to a repeating pattern.
Figure 6B:
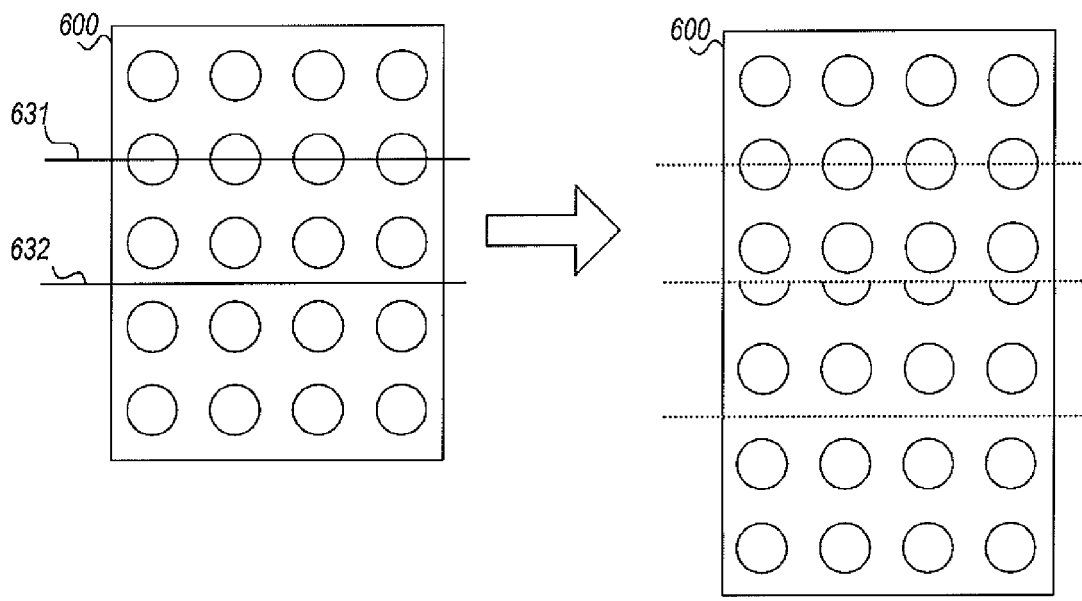
FIG. 6B illustrates the auto-expanding user-editable content container of FIG. 6A where the guides are set to a position resulting in a non-repeating pattern.

FIGS. 6A and 6B further illustrate the rules pertaining to the guides, in particular with respect to a repeating pattern. As shown in FIG. 6A, an auto-expanding user-editable content container 600 includes a repeating pattern of circles. If the guides 631, 632 are placed as shown, the pattern between the guides may be grown, as shown. In FIG. 6B, the guides are placed so that the pattern between the guides 631, 632 is not a repeating pattern. Thus, when the auto-expanding user-editable content container is grown by adding an instance of the pattern between the guides, the result is undesirable.

The content placed in an auto-expanding user-editable content container while using the web page template building tool is content that will appear as a background layer in the final template. Thus, in the final template, any content in the auto-expanding user-editable content container is flattened into a background layer. Thus, when an end user utilizes the template as a starting point in designing a web page, the end user will insert text and other content in the auto-expanding user-editable content container, which will appear over the flattened content inserted by the web page template designer.

Turning now to the navigation area 420 of FIG. 4, the navigation area 420 comprises two layers designated for navigation items—the first is a navigation button layer and the second is a navigation background layer. The navigation button layer includes six structural items: two for each "state" of button (regular, currently active page, and "hover"). For each state, there is an item that represents the button background and a text frame item that represents the button text.

When designing a website template, the designer will preferably keep the three buttons in order, equally spaced, and aligned on a point boundary. The buttons should be aligned horizontally or vertically, depending on the orientation of the navigation area. Artwork can be added to the button items, or be drawn on the navigation button layer in the same space. Any artwork in the navigation button layer outside of the boundaries of the button background objects are ignored.

The navigation background layer contains the structural item that represents the entire navigational area. This area must be above the upper guide, and to the left of the content area. It must contain all three buttons. The amount of spacing around it determines how much space is added to the navigational area in each direction, beyond the size of the buttons.

Preferably, the web page template supports two orientations for the navigational area: horizontal and vertical. In both cases, the buttons are always set to a fixed size, determined by the designer. In an embodiment, only a single row or a single column of buttons is supported.

Vertical navigational areas are always grown downward. Horizontal navigational areas grow as follows: If the navigational area is near the left edge of the page, the navigational area will grow to the right; if the navigational area is near the right edge of the page, the navigational area will grow to the left; otherwise, the navigational area will grow to the left and the right (from the center).

Figure 7A:
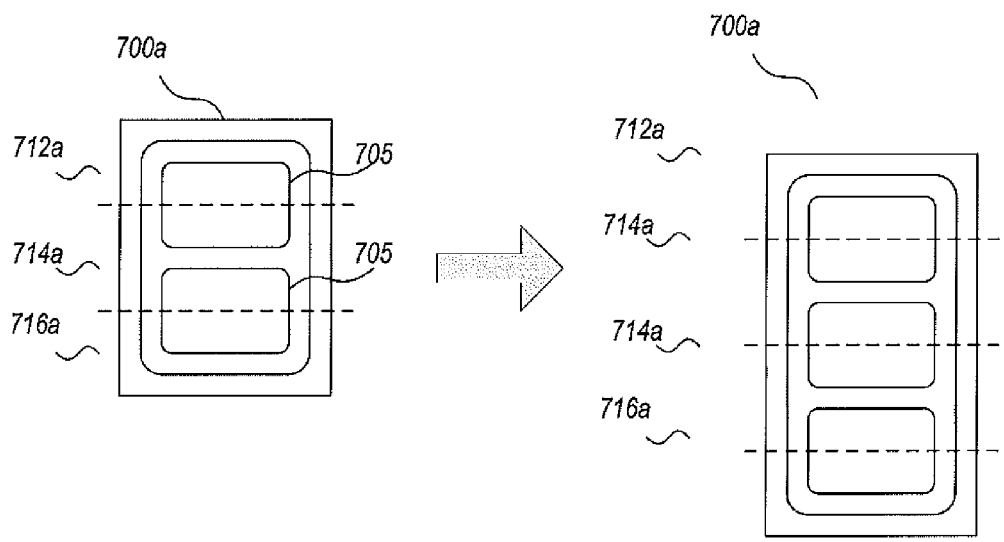
FIG. 7A illustrates the partitioning of a vertical navigational area to grow and shrink as navigation buttons are added and removed.

To support growing and shrinking of the navigation buttons, a navigational area 700 is automatically split into three "sections", illustrated in FIG. 7A. The sections include the area 712a from the top (or left 712b, for horizontal navigational areas, shown in FIG. 7B) of the navigational area to the middle of the top button, the area 714a from the middle of the top button to the middle of the second button (or middle of the left button to the middle of the second button, shown in FIG. 7B), and the area 716a from the middle of the last button to the bottom (or right 716b, for horizontal navigational areas, shown in FIG. 7B) of the navigational area.

When the navigational area is rendered, the second section 714a (or 714b) is repeated as many times as necessary to accommodate all buttons 705.

In an exemplary embodiment, the web page template building tool configures the navigational area 420 with a control that allows an end user of the template to select between a horizontal or vertical navigation menu orientation, and select and edit names of the selected navigation buttons. Further, the control may be configured to automatically detect a condition in which the navigation area cannot be fully displayed in the horizontal orientation and generates a request to the customer to change the navigation menu orientation to a vertical orientation. Alternatively, the control may simply automatically change the navigation menu orientation to a vertical orientation when this condition occurs.

The navigational area control may be configured to automatically size the navigation buttons identically and automatically determines and sizes the navigation button names with identically sized font. In an exemplary implementation, the navigational area control performs the steps of: for each respective navigation button, automatically determining a size of text used for the navigation button name, determining an amount to scale the current sized text to make the text the full width of the navigation button, determining an amount to scale the current sized text to make the text the full height of the navigation button, selecting the smaller of the horizontal scale and vertical scale; selecting the smallest of each of the selected scales over all of the navigation buttons as the global navigation button scale; and scaling each of the navigation button names to the global navigation button scale. In yet another exemplary implementation, the navigational area control performs the steps of: for each respective navigation button, automatically determining a size of text used for the navigation button name, determining an amount to scale the current sized text to make the text the full width of the navigation button, determining an amount to scale the current sized text to make the text the fill height of the navigation button, selecting the smaller of the horizontal scale and vertical scale; selecting the smallest of each of the selected scales over all of the navigation buttons as the global navigation button scale; and scaling each of the navigation button names to the global navigation button scale.

To create a web page template building tool 84 creates HTML pages that handle a variable amount of customer text, growing the page as necessary and uses HTML that renders reliably in a wide variety of browsers.

Figures 8, 9:
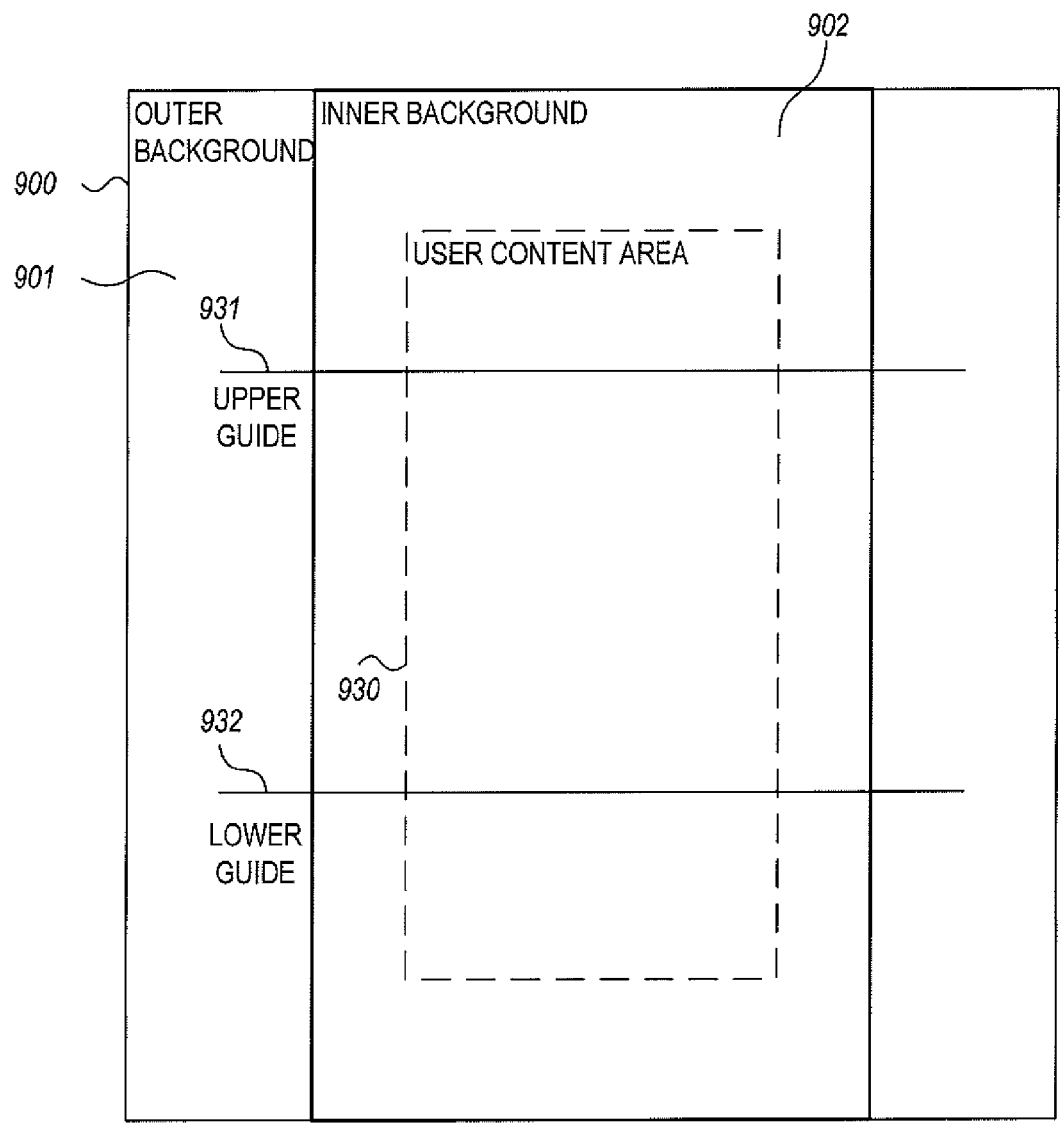
FIG. 8 is an exemplary table created to describe an outer and inner background of a web page template.
FIG. 9 is an exemplary web page template layout.

In an embodiment, the web page template building tool 84 creates an outermost table, illustrated in FIG. 8, to describe the outer and inner background. A "body" tag is used to describe the outer background, so that the outer background can also extend below the theme content. In either case, the rest of the content goes in the main content cell.

FIG. 9 shows the elements of the web page template. As illustrated, the template 900 includes an outer background 901, an inner background, 902, and an auto-expanding user-editable content container 930 with upper and lower guides 931, 932. The section between the two horizontal guides 931, 932 is the "growable section".

Figure 10:
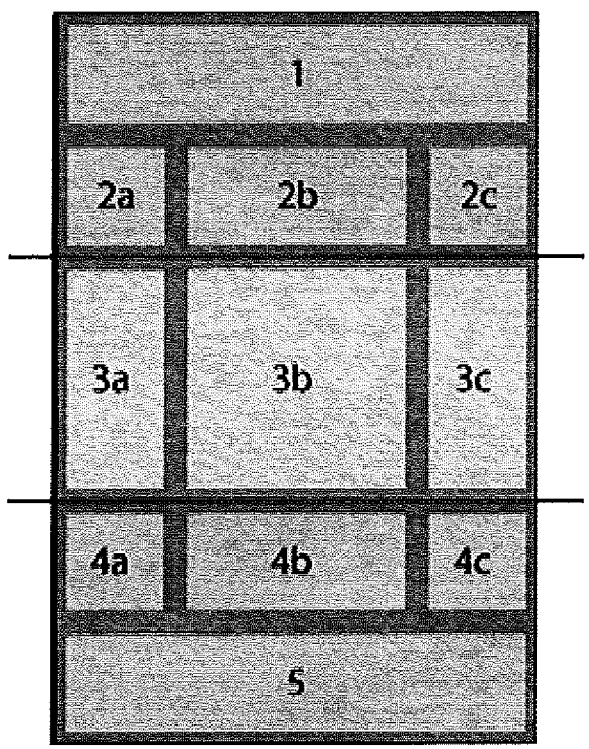
FIG. 10 is a diagram illustrating sections of the web page template that are rasterized into separate images.

To create the web page template, all of the artwork that appears in the theme is rasterized into 11 images, shown in FIG. 10 as 1, 2a, 2b, 2c, 3a, 3b, 3c, 4a, 4b, 4c, 5. The images 3a, 3b, 3c are patterns that repeat vertically (and so may be rendered at less than the whole height indicated.) After rasterizing the page into the aforementioned images, the web page template building tool then constructs an HTML table with the cells illustrated in FIG. 11 labeled Top, Left, Body, Right, and Bottom.

Figure 11:
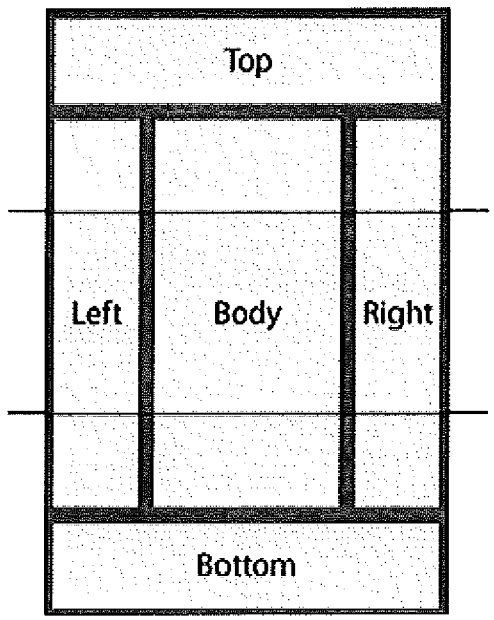
FIG. 11 is an HTML table illustrating an example web page template.

The "top" cell in FIG. 11 contains only image 1 (and so the cell is exactly the same size as the image.) The "left" cell in FIG. 1 contains image 3a as a background image. It also contains a div with "position=relative", and inside that div, image 2a with "position-absolute". The "middle" cell in FIG. 11 is similar; it contains image 3b as a background image. It also contains a div with "postition=relative". Inside that div is image 2b with "position=absolute", and also all of the user-entered site content. The "right" cell in FIG. 11 is exactly analogous to the "left" cell (image 3c and 2c, accordingly). The "bottom" cell in FIG. 11 contains a div with "position=relative".

Inside that div, images 4a, 4b, and 4c are positioned absolutely (with a negative 'top' coordinate) to put them at the bottom of the previous table cells. The div also contains image 5 with "position=absolute". The middle row has a height specified, so that it is guaranteed to be sufficiently tall enough to contain images 2a, 2b, 2c and images 4a, 4b, 4c. Additionally, if images 3a, 3b, and 3c are taller than one pixel, a JavaScript executes to increase the height of the middle row so that, once the text is added, it is a multiple of the pattern repeat—this allows patterns to be repeated across the entire website.

The navigation buttons are rendered in the "left" table cell, but uses absolute positioning for the buttons so they may appear in other cells as necessary. The navigational area can also include background imagery that grows or shrinks depending on the number of buttons on the site. Vertically-oriented navigational areas can grow vertically. We always move the upper guide down, so that the entire navigational area appears above the growable section of the page. This means the navigational area background will always be in images 1, 2a, 2b, and 2c only.

The images and controls that make up a theme are specified in absolute coordinates. For each of the images (1, 2b, ..., 4c, 5) a bitmap of the appropriate size is created, and portions of the theme images are copied into them using GDI+. For example, if the "lower guide" is at vertical position 700; the "body content rectangle" has its bottom at position 800 and it's left-edge at position 200, then for image 4a an image 200 pixels wide by 100 pixels tall is created, and all of the theme imagery that occurs in the rectangle (0,700)-(200,800) is flattened.

The result is a web page template that grows and shrinks according to the amount of content inserted in the auto-expanding user-editable content containers by an end user and that is reliably displayable in a multitude of different browsers and display types.

Preferably, the web page template building tool 82 retrieves at least one graphical element (for example a customer's logo) from an electronic design editable by the document design tool and inserts the at least one graphical element into the website template. In an exemplary embodiment, the web page template building tool 82 pre-populates the web page template with content retrieved from an electronic design of a product designed to be printed which is open in the document design tool.

Figure 12:
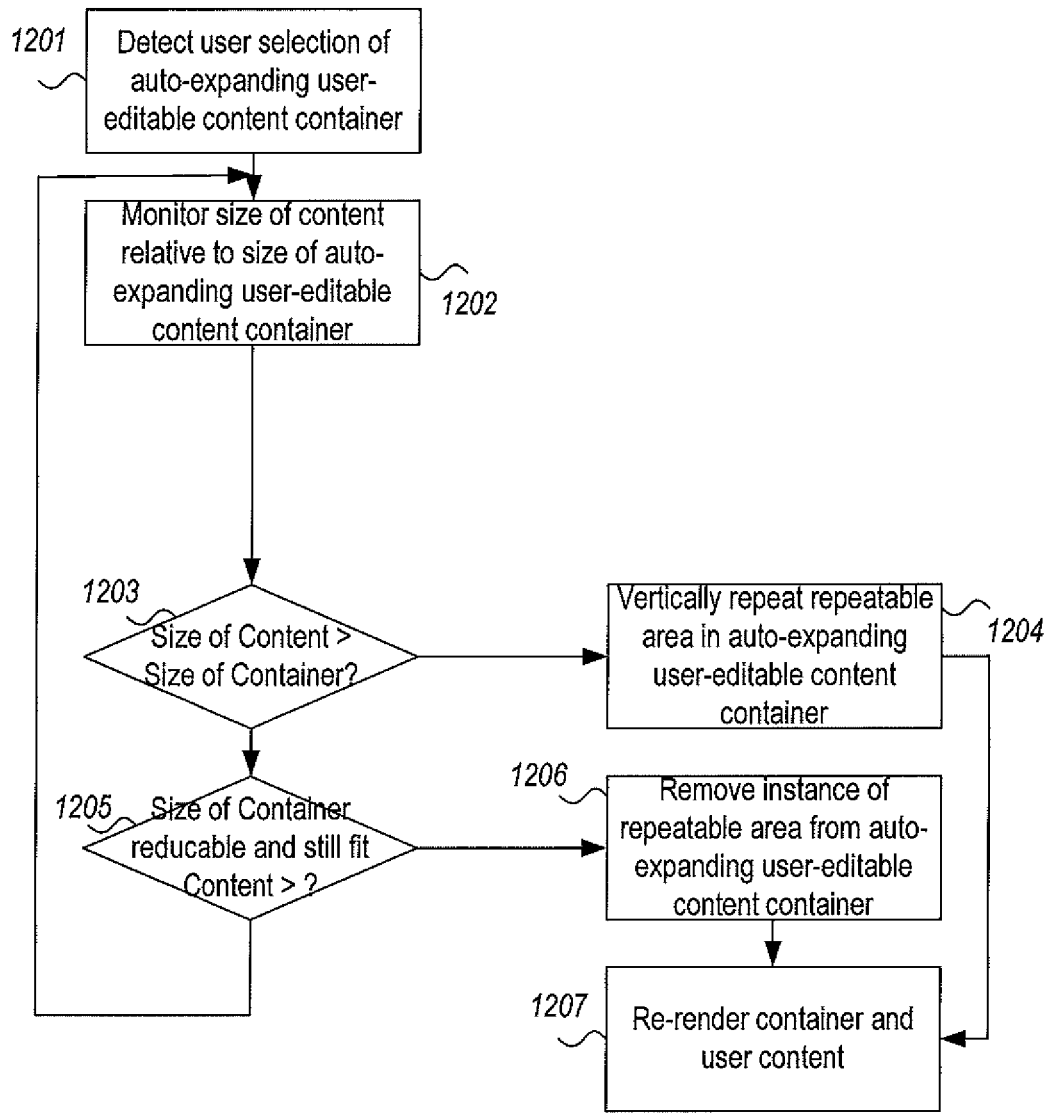
FIG. 12 is a flowchart of an exemplary embodiment of the operation of an auto-expanding user-editable content container when content is added by an end user.

FIG. 12 is a flowchart of an exemplary embodiment of the operation of an auto-expanding user-editable content container when content is added by an end user. As illustrated, user selection of the auto-expanding user-editable content container is monitored (step 1201), and the amount of text or other content added to the container is monitored (step 1202). If it is detected that the size of the content exceeds the current sized of the container (step 1203), then the container is expanded by vertically repeating the repeatable area (defined as the area between the horizontal guides 432, 433) (step 1204). If it is detected that the size of the content is such that an instance of the repeatable area can be removed from the container and still fit the content therein (step 1205), then one or more repeatable areas are removed from the container (step 1206). The container and user content is rerendered on the user's display (step 1207). Thus, the content between the guides is repeated or removed to most efficiently match the amount of text (and/or other user-inserted content) in the auto-expanding user-editable content container. The implementation of the auto-expanding user-editable content container is preferably implemented using JavaScript.

Figure 7B:
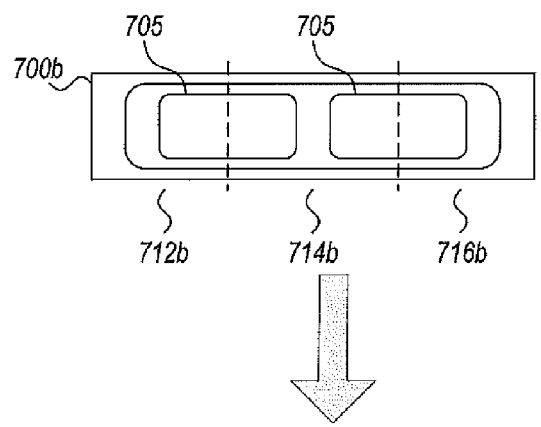
FIG. 7B illustrates the partitioning of a horizontal navigational area to grow and shrink as navigation buttons are added and removed.
Figure 7B:
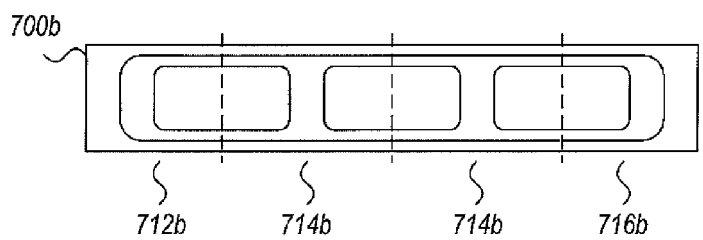
Figure 13:
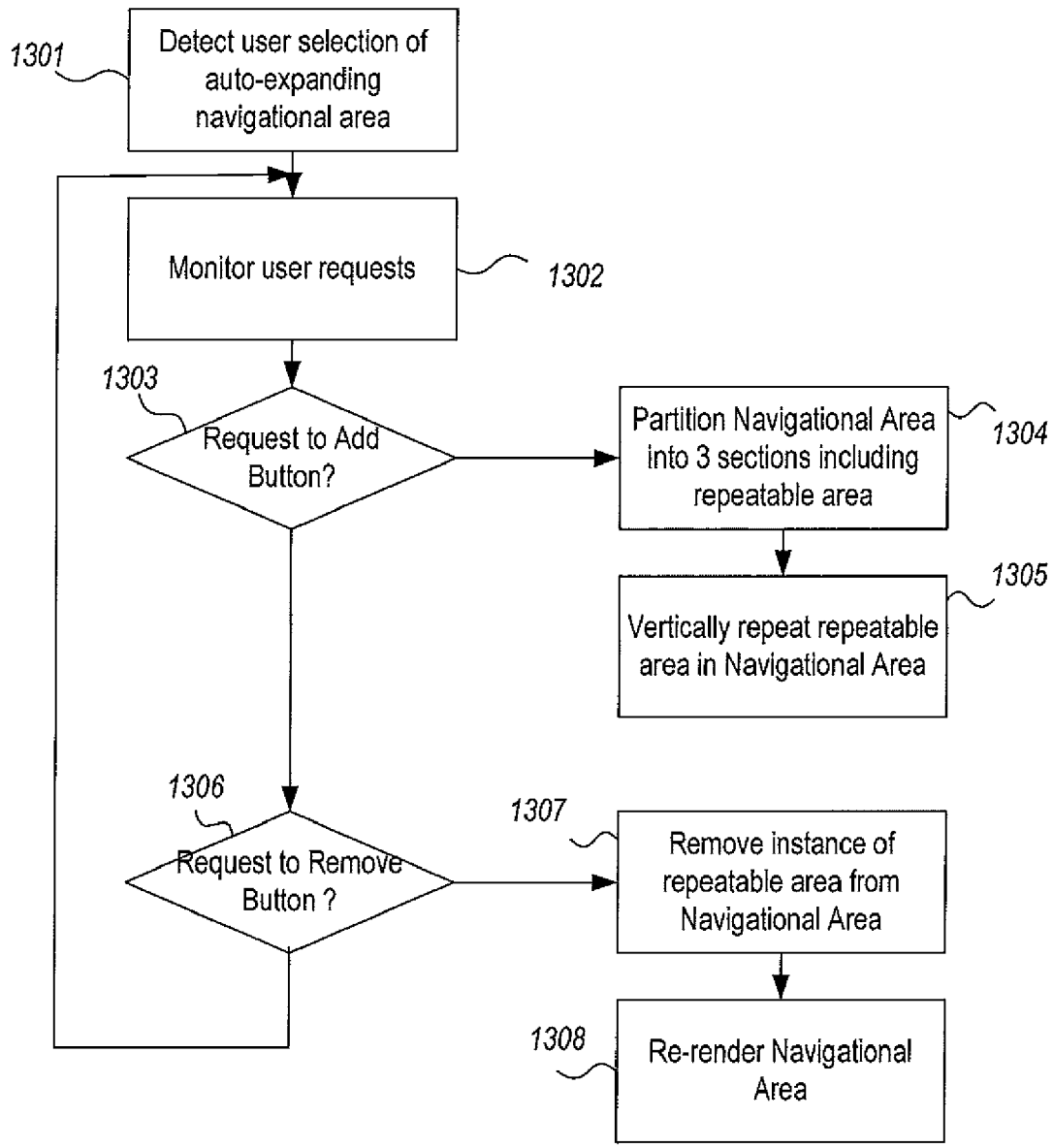
FIG. 13 is a flowchart of an exemplary embodiment of the operation of an auto-expanding navigational area when navigation buttons are added or removed from a navigational area by an end user.

FIG. 13 is a flowchart of an exemplary embodiment of the operation of an auto-expanding navigational area when navigation buttons are added or removed from a navigational area by an end user. As illustrated, user selection of the auto-expanding navigational area is monitored (step 1301). User requests are monitored (step 1302). If a user request to add a navigation button is detected (step 1303), the navigational area is partitioned into three sections, including a top or left section, a repeatable middle section, and bottom or right section (step 1304), as previously discussed with respect to FIGS. 7A and 7B. The repeatable middle section is repeated once (as illustrated in FIGS. 7A and 7B) to add the button (step 1305). If a user request to remove a navigation button is detected (step 1306), if there is only one button, the action is prevented. If there is at least two buttons, then an instance of the repeatable middle section is removed from the navigational area and the remaining sections joined (step 1307). The navigational area is then re-rendered on the user's display (step 1308).

While exemplary embodiments of the invention have been discussed, the described embodiment is to be considered as illustrative rather than restrictive. The scope of the invention is as indicated in the following claims and all equivalent methods and systems.

What is claimed is:

1. A web page building system, comprising:
one or more processors providing an editable web page template on a user's display, the web page template comprising an auto-expanding navigation area comprising a first navigation area portion comprising a first half of a button, a second navigation area portion comprising a second half of a button, and zero or more repeatable middle navigation area portions, each repeatable middle navigation area comprising a first half of a button and a second half of a button wherein the second half of the button is configured to seamlessly align with the first half of a button of either the first navigation area portion or another instance of the middle navigation area portion, and wherein the first half of the button is configured to seamlessly align with a second half of a button of either the second navigation area portion or another instance of the middle navigation area portion; and
a navigation area control associated with the auto-expanding navigation area, which receives from the user an indication of a number of buttons to be displayed in the navigation area, and which causes the one or more processors to render the first navigation area portion, an instance of the middle navigation area portion once for each button greater than two buttons, and the second navigation area portion such that each first half of a button in the navigation area seamlessly aligns with a matching second half of a button in the navigation area.

2. The web page building system of claim 1, wherein the navigation area control monitors the selected number of buttons, and if a change in the selected number of buttons is detected, causes the one or more processors to re-render the navigation area, including rendering the first navigation area portion, rendering an instance of the middle navigation area portion once for each button greater than two buttons, and rendering the second navigation area portion such that each first half of a button in the navigation area seamlessly aligns with a matching second half of a button in the navigation area.

3. The web page building system of claim 1, wherein the navigation area control allows an end user of the template to select and edit names of the navigation buttons, and automatically determines and sizes the navigation names with identically sized font so that each name fits within its respective identically sized navigation button.

4. The web page building system of claim 1, wherein the auto-expanding navigation area comprises at least one repeatable middle navigation area portion.

5. The web page building system of claim 1, wherein the auto-expanding navigation area comprises a plurality of repeatable middle navigation area portions.

6. The web page building system of claim 1, wherein the navigation area control allows an end user of the template to select between a horizontal or vertical navigation menu orientation, and wherein
if the user selects the vertical navigation menu orientation, the first navigation area portion is a top navigation area portion, the first half of each button in the top navigation area portion and each instance of the middle navigation area portion is a top half of a button, the second navigation area portion is a bottom navigation area portion, and the second half of each button in the bottom navigation area portion and each instance of the middle navigation area portion is a bottom half of a button, and
if the user selects the horizontal navigation menu orientation, the first navigation area portion is a left navigation area portion, the first half of each button in the left navigation area portion and each instance of the middle navigation area portion is a left half of a button, the second navigation area portion is a right navigation area portion, and the second half of each button in the right navigation area portion and each instance of the middle navigation area portion is a right half of a button.

7. The web page building system of claim 1, wherein the first navigation area portion is a top navigation area portion, the first half of each button in the top navigation area portion and each instance of the middle navigation area portion is a top half of a button, the second navigation area portion is a bottom navigation area portion, and the second half of each button in the bottom navigation area portion and each instance of the middle navigation area portion is a bottom half of a button.

8. The web page building system of claim 1, wherein the first navigation area portion is a left navigation area portion, the first half of each button in the left navigation area portion and each instance of the middle navigation area portion is a left half of a button, the second navigation area portion is a right navigation area portion, and the second half of each button in the right navigation area portion and each instance of the middle navigation area portion is a right half of a button.

9. A method for allowing a user to customize a web page, comprising:
displaying, by one or more processors, an editable web page template on a user display,
providing within the editable web page template, by one or more processors, an auto-expanding navigation area comprising a first navigation area portion comprising a first half of a button, a second navigation area portion comprising a second half of a button, and zero or more repeatable middle navigation area portions, each repeatable middle navigation area comprising a first half of a button and a second half of a button wherein the second half of the button is configured to seamlessly aligns with the first half of a button of either the first navigation area portion or another instance of the middle navigation area portion, and wherein the first half of the button is configured to seamlessly aligns with a second half of a button of either the second navigation area portion or another instance of the middle navigation area portion, receiving, by one or more processors, a number of buttons to be displayed in the navigation area, rendering, by one or more processors, the first navigation area portion, an instance of the middle navigation area portion once for each button greater than two buttons, and the second navigation area portion such that each first half of a button in the navigation area seamlessly aligns with a matching second half of a button in the navigation.

10. The method of claim 9, further comprising:

providing within the editable web page template, by one or more processors, a navigation area control associated with the auto-expanding navigation area configured to receive from a user the number of buttons to be displayed in the navigation area.

11. The method of claim 9, wherein the auto-expanding navigation area comprises at least one repeatable middle navigation area portion.

12. The method of claim 9, wherein the auto-expanding navigation area comprises a plurality of repeatable middle navigation area portions.

13. The method of claim 9, further comprising:

receiving, by one or more processors, a navigation menu orientation selection of one of a horizontal or vertical navigation menu orientation, and wherein if the navigation menu orientation selection corresponds to the vertical navigation menu orientation, rendering the first navigation area portion as a top navigation area portion, the first half of each button in the top navigation area portion and each instance of the middle navigation area portion as a top half of a button, the second navigation area portion as a bottom navigation area portion, and the second half of each button in the bottom navigation area portion and each instance of the middle navigation area portion as a bottom half of a button, and if the navigation menu orientation selection corresponds to the horizontal navigation menu orientation, rendering the first navigation area portion as a left navigation area portion, the first half of each button in the left navigation area portion and each instance of the middle navigation area portion as a left half of a button, the second navigation area portion as a right navigation area portion, and the second half of each button in the right navigation area portion and each instance of the middle navigation area portion as a right half of a button.

14. The method of claim 9, further comprising:

rendering the first navigation area portion as a top navigation area portion, the first half of each button in the top navigation area portion and each instance of the middle navigation area portion as a top half of a button, the second navigation area portion as a bottom navigation area portion, and the second half of each button in the bottom navigation area portion and each instance of the middle navigation area portion as a bottom half of a button.

15. The method of claim 9, further comprising:

rendering the first navigation area portion as a left navigation area portion, the first half of each button in the left navigation area portion and each instance of the middle navigation area portion as a left half of a button, the second navigation area portion as a right navigation area portion, and the second half of each button in the right navigation area portion and each instance of the middle navigation area portion as a right half of a button.

* * * * *